United States Patent
Chen et al.

(10) Patent No.: US 7,657,679 B2
(45) Date of Patent: Feb. 2, 2010

(54) PACKET PROCESSING SYSTEMS AND METHODS

(75) Inventors: Wen-Chung Chen, Cupertino, CA (US); Li Liang, Shanghai (CN); Shou-Yu (Joyce) Cheng, San Jose, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 483 days.

(21) Appl. No.: 11/549,389

(22) Filed: Oct. 13, 2006

(65) Prior Publication Data

US 2007/0088877 A1  Apr. 19, 2007

Related U.S. Application Data

(60) Provisional application No. 60/726,533, filed on Oct. 14, 2005.

(51) Int. Cl.
*G06F 13/00* (2006.01)
*G06F 12/02* (2006.01)
*G06T 1/00* (2006.01)

(52) U.S. Cl. .................. 710/105; 345/530; 345/544

(58) Field of Classification Search ........... 710/105, 710/106; 345/418, 419, 421, 422, 501, 530, 345/531, 544, 549, 555, 581, 589, 540, 520
See application file for complete search history.

(56) References Cited

U.S. PATENT DOCUMENTS

| | | | | |
|---|---|---|---|---|
| 5,491,811 | A | * | 2/1996 | Arimilli et al. ............... 711/144 |
| 5,585,824 | A | * | 12/1996 | Sherburne .................... 345/540 |
| 5,856,832 | A | * | 1/1999 | Pakenham et al. .......... 345/540 |
| 6,002,412 | A | * | 12/1999 | Schinnerer ................... 345/558 |
| 6,094,429 | A | * | 7/2000 | Blanchette et al. .......... 370/347 |
| 6,104,413 | A | * | 8/2000 | Cheng et al. ................. 345/552 |
| 6,614,438 | B1 | * | 9/2003 | Bru ............................. 345/520 |
| 6,919,902 | B2 | * | 7/2005 | Jeffrey et al. ................. 345/560 |
| 7,286,134 | B1 | * | 10/2007 | Van Dyke et al. ............ 345/544 |
| 7,420,568 | B1 | * | 9/2008 | Bittel et al. .................. 345/544 |
| 7,474,313 | B1 | * | 1/2009 | Bittel et al. .................. 345/531 |
| 2002/0078011 | A1 | * | 6/2002 | Lee et al. ........................ 707/1 |
| 2002/0169808 | A1 | * | 11/2002 | Fromm ....................... 708/204 |
| 2003/0030642 | A1 | * | 2/2003 | Chen et al. ................... 345/519 |

\* cited by examiner

*Primary Examiner*—Mark Rinehart
*Assistant Examiner*—Trisha Vu
(74) *Attorney, Agent, or Firm*—Thomas, Kayden, Horstemeyer & Risley

(57) ABSTRACT

Packet processing system and method embodiments implemented in a peripheral component interconnect-express (PCIE) compliant system are disclosed. One method embodiment, among others, comprises receiving a packet having at least a first type of data and a second type of data over a PCIE connection, and segregating the entire packet into two contiguous groups, a first group comprising the first type of data and a second group comprising the second type of data.

20 Claims, 6 Drawing Sheets

PACKET PROCESSING SYSTEMS AND METHODS

CROSS-REFERENCE TO RELATED APPLICATION

This application claims priority to copending U.S. provisional application entitled, "PACKET PROCESSING SYSTEMS AND METHODS," having Ser. No. 60/726,533, filed Oct. 14, 2005, which is entirely incorporated herein by reference.

TECHNICAL FIELD

The present invention is generally related to computer systems, and more particularly, is related to data transfer systems and methods in computer systems.

BACKGROUND

Data transfer occurs between a central processing unit and memory and various other components in a computer system through a collection of wires or an internal bus. Data transfer may also occur between internal components and external devices through a bus, often referred to as an expansion bus. Various standards have been created that specify the manner of data transfer over a bus. For instance, the peripheral component interconnect (PCI) standard is a local bus standard developed by INTEL. A local bus comprises a data bus that may be connected directly to a microprocessor. Another standard, referred to as PCI-Express (PCIE), is an input/output (I/O) interconnect bus standard that comprises a defined protocol and architecture. The PCIE standard expands upon the PCI standard, for instance, by doubling the data transfer rates. PCIE specifies a 2-way serial connection that carries data in packets along two pairs of point-to-point data lanes (as opposed to the single parallel data bus of PCI). PCIE was developed to address the high data transfer speeds found in such high speed interconnects as 1394b, USB 2.0, InfiniBand, and Gigabit Ethernet.

One challenge presented by PCIE is that of not allowing bytes to be skipped during write operations to various components (e.g., writes to memory). For instance, some applications, such as stencil (s-data) and depth (z-data) operations in graphics processing applications or color/alpha processing, may not require the entire packet body to be utilized. For instance, with regard to stencil and depth operations, the z-data occupies three of four bytes, s-data occupies one of the four bytes, and computation of z-values may be the operation of interest (to the exclusion of the s-data). Conventional approaches have fallen into two broad categories of solutions to this problem. One approach is to perform a read operation before the write, enabling a combined (merged) write that results in whatever was not intended to be written (e.g., stencil byte) to simply be re-written as it was. However, one problem with such a read and write approach is that such operations tend to be inefficient, which thus hampers performance.

Another approach is to segment the packet into manageable units to obtain the byte-enable features of the conventional PCI standard. That is, the conventional PCI standard includes provisions for byte-masks at the head and tail portion of the packet (i.e., only a portion of the entire packet body). For example, for a 512-bit packet, the packet may be segmented into eight transactions of 8 bytes each (e.g., four-bit mask at the header and four-bit mask at the tail). That is, the byte-mask may be enabled for only head and tail portions of bytes for each segment, allowing for selective write operations to be transacted. One downside of such an approach is that for each segmented packet a header needs to be appended, which may result in poor performance due to the passing of additional packet headers.

SUMMARY

Embodiments of the present disclosure provide systems and methods for processing packets in a peripheral component interconnect-express (PCIE) compliant environment. Such systems and methods receive one or more packets of data. One packet may have one or more different types of data that are not needed for a particular access request. For instance, in an exemplary graphics processing environment implemented using a PCIE protocol, two different types of data, depth data (z-data) and stencil data (s-data), may be used. The depth data processing (z-data) may require a read or write operation implemented on z data that is included in a packet also having stencil data, which is not required for this particular write operation. Certain embodiments of the packet processing systems disclosed herein segregate (separate) the z-data and stencil data into contiguous bytes of a first stencil data group and a second z-data group. This grouping enables the packet processing system to selectively write one group to the exclusion of the other group.

Briefly described, in architecture, one embodiment comprises a packet processing system in a PCIE compliant system. Such a system comprises a receiver for receiving a packet having at least a first type of data and a second type of data over a PCIE connection, and a segregator for segregating the entire packet into two contiguous groups, a first group comprising the first type of data and a second group comprising the second type of data.

The present disclosure also includes various method embodiments. One method embodiment, among others, comprises receiving a packet having at least a first type of data and a second type of data over a PCIE connection, and segregating the entire packet into two contiguous groups, a first group comprising the first type of data and a second group comprising the second type of data.

Another embodiment comprises a graphics processor system. The graphics processor system comprises a peripheral component interconnect-express (PCIE) connection, and a graphics processing unit coupled to the PCIE connection, the graphics processing unit comprising packet logic configured to receive a packet having at least two types of data over the PCIE connection and separate the entire packet into two contiguous groups, a first group comprising a first type of data and a second group comprising a second type of data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of packet processing systems and methods. Such packet processing systems and methods employ a byte mask to an entire packet body (or equivalently, an entire packet) to enable select write and/or read operations to a circuit component, such as memory. By employing a byte mask to the entire packet body, processing speeds and efficiencies are improved when compared to conventional systems. As previously described, conventional PCI systems can apply a byte mask to the tail and head of a packet, but not to the entire body of the packet. Such conventional systems must break up a packet into manageable segments and append a header for each segment, resulting in poor performance due to increased processing time and storage requirements due in part to the appended header. The packet processing systems and methods described herein obviate the need for segmenting the packet body and appending headers to each segment or the need for performing read and write operations as found in conventional systems. Thus, the packet processing systems and methods described herein enable contiguous writes to a component.

Certain embodiments of the packet processing systems and methods are described below in the context of a graphics processing environment that includes a graphics processing unit that generates triangles (or other primitives) and processes depth (z) data and stencil (s) data over a peripheral component interconnect express (PCIE) bus. However, one skilled in the art would understand in light of the disclosure that other bus communication protocols and standards may similarly fall within the scope of the disclosure. Further, although described in the context of write implementations, one skilled in the art would understand that read implementations would similarly benefit from the principles of the disclosed embodiments. Additionally, although described in the context of stencil and depth data, others types of data may similarly be used, such as the segregation and swapping of alpha data and color (e.g., RGB) data.

Figure 1:
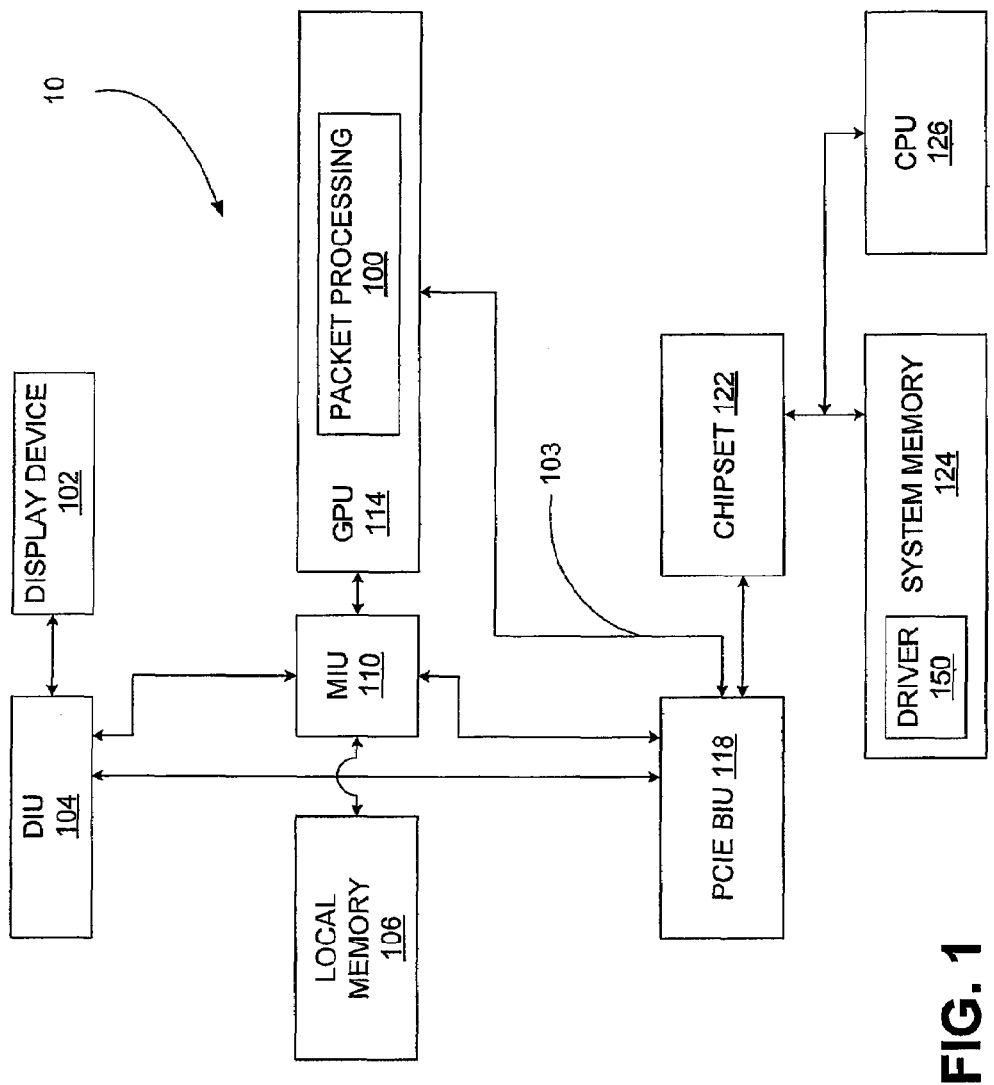
FIG. 1 is a block diagram of an exemplary graphics processor system, which serves as an exemplary environment in which embodiments of a packet processing system (and method) may be implemented.

FIG. 1 is a block diagram of an exemplary graphics processor system 10, which serves as an exemplary environment in which embodiments of a packet processing system 100 (and method) may be implemented. In some implementations, the graphics processor system 10 may be configured as a computer system. The graphics processor system 10 may comprise a display device 102 driven by a display interface unit (DIU) 104 and local memory 106 (e.g., which may comprise a display buffer, texture buffer, command buffer, frame buffer, etc.). Local memory 106 may also be referred to interchangeably herein as a frame buffer, storage unit, or simply memory. Local memory 106 is coupled to a graphics processing unit (GPU) 114 through a memory interface unit (MIU) 110. The MIU 110, GPU 114, and DIU 104 are coupled in one embodiment to a peripheral component interconnect express (PCIE) compatible bus interface unit (BIU) 118. For instance, one embodiment of the PCIE BIU 118 may be implemented using a graphics address remapping table (GART), although other memory mapping mechanisms may be employed. The BIU 118 and GPU 114 may be communicatively coupled via a PCIE connection 103, over which data and/or commands may be provided. In one embodiment, the BIU 118 and MIU 110 are configured to send and receive data according to the PCIE protocol and double data rate (DDR) memory protocol, respectively, as is known.

The BIU 118 is coupled to a chipset 122 (e.g., north bridge chipset) or switch. The chipset 122 comprises interface electronics to strengthen signals from a central processing unit (CPU) 126 (also referred to herein as a host processor) and to separate signals to and from a system memory 124 from those signals going to and from input/output (I/O) devices (not shown). Although a PCIE bus protocol is described, other manners of connection and/or communication between the host processor and the GPU 114 may be implemented in some embodiments (e.g., PCI, proprietary high-speed bus, etc.). The system memory 124 also comprises a graphics application (not shown) and driver software 150, which communicates instructions or commands through the use of the CPU 126 to registers in the GPU 114 and DIU 104. The driver software 150 or functionality of the same may be stored in system memory 124 and executed by the CPU 126. In one embodiment, the driver software 150 provides compiled code (e.g., shader code) to the GPU 114 for execution in the GPU 114.

Additional graphics processing units may be employed in some embodiments, coupled for instance to the components shown in FIG. 1 through the chipset 122 via a PCIE bus protocol. In one embodiment, the graphics processor system 10 may be embodied in all of the components shown in FIG. 1, or fewer and/or different components than those shown in FIG. 1. Further, in some embodiments, additional components may be used, such as a south bridge chipset coupled to the chipset 122.

The packet processing systems 100 can be implemented in hardware, software, and/or firmware. When implemented in hardware (such as packet (P) units described below), the hardware can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

When implemented in software or firmware, such as the driver software 150 controlling the hardware processing, such driver software 150 may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In addition, the scope of the certain embodiments of the present invention includes embodying the functionality of the preferred embodiments of the present invention in logic embodied in hardware or software-configured mediums.

Figure 2A:
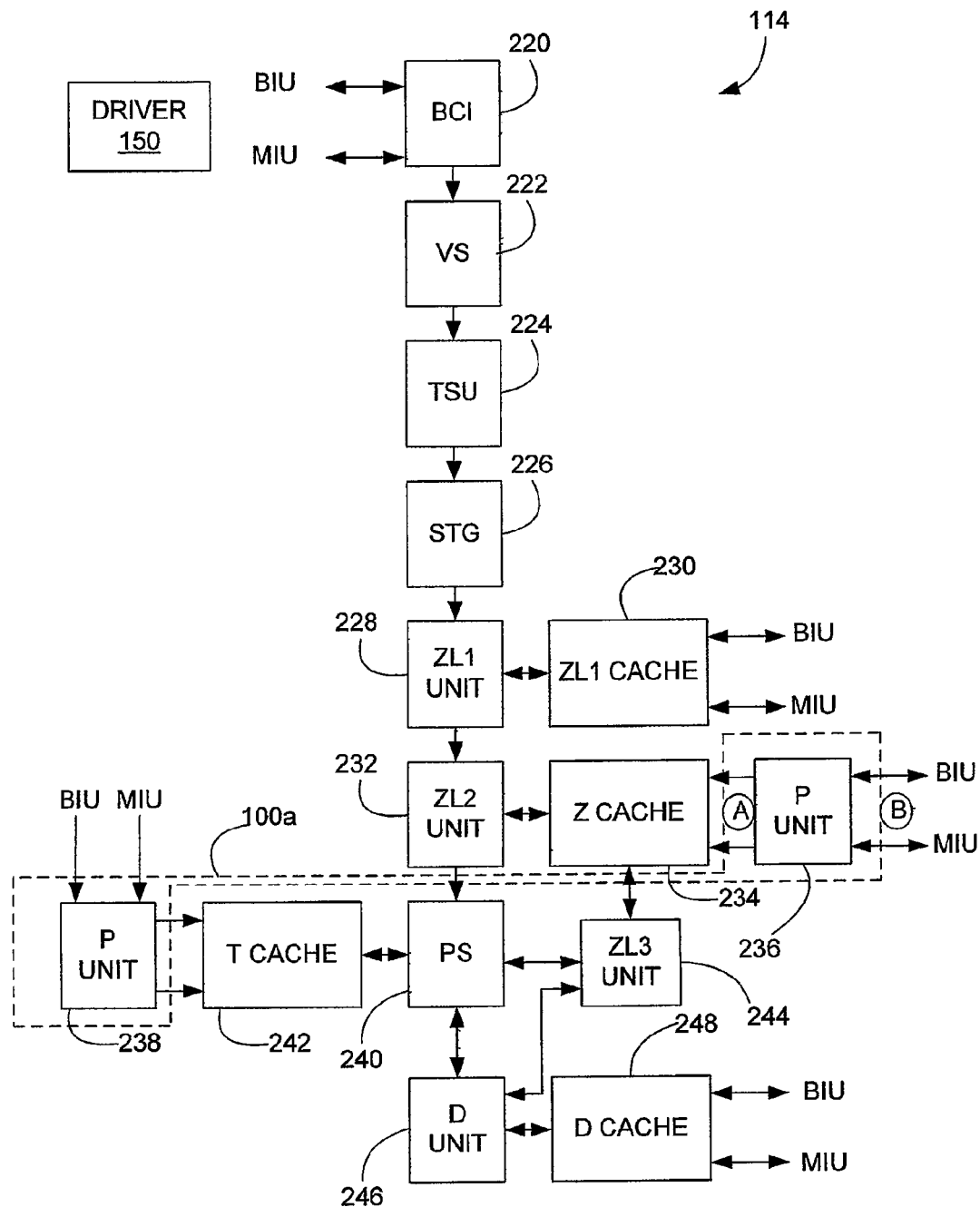
FIG. 2A is a functional block diagram of select portions of embodiments of the exemplary graphics processor system and packet processing system shown in FIG. 1.

FIG. 2A is a functional block diagram of select portions of an embodiment of the GPU 114, including an embodiment of a packet processing system 100, designated as 100a. The GPU 114 may include a buffer control initialization (BCI) unit 220, vertex shader (VS) 222, triangle setup unit (TSU) 224, span and tile generation (STG) unit 226, ZL1 unit 228, ZL1 cache 230, ZL2 unit 232, Z cache 234, P units 236 and 238, pixel shader (PS) 240, texture (T) cache 242, ZL3 unit 244, destination (D) unit 246, and D cache 248. Functionality of one or more of the various components may be implemented as fixed function units or through the use of code implemented on programmable processing units. The BCI unit 220 receives data and commands from a bus interface unit, such as BIU 118 (FIG. 1), and responsively initializes the processing of the vertex data. The P units 236 and 238, and ZL1 cache 230 and D cache 248, respectively, interface (perform read and write operations) with a memory interface unit, such as MIU 110, as well as the BIU 118. Note that the P units 236 and 238 may be physically embodied in the Z cache 234 and T cache 242, respectively, in some embodiments. The P units 236 and 238 (also referred to herein individually or collectively as packet logic) comprise an embodiment of the packet processing system 100a, as delineated by the dotted line, although fewer or greater components may be included in some embodiments of a packet processing system 100. For instance, the packet processing system 100a may further comprise driver software 150 that is configured to control processing of the P units 236 and 238, and/or a core processor (e.g., engine), or may be embodied as the entire graphics processing unit 114 or graphics processor system 10 in some embodiments.

Figure 2B:
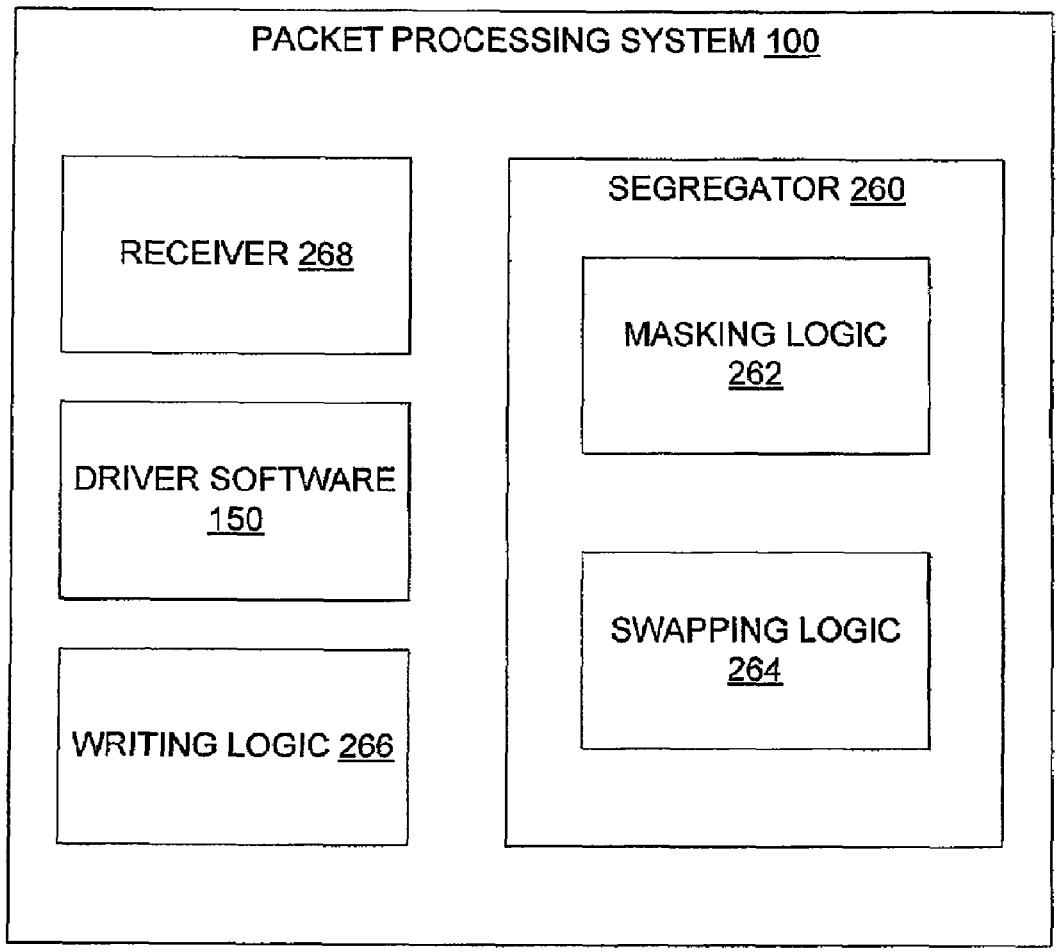
FIG. 2B is a functional block diagram that illustrates one embodiment of a packet processing system as shown in FIG. 2A.

FIG. 2B comprises a functional block diagram that illustrates one embodiment of the packet processing system 100. As shown, the packet processing system 100 comprises a segregator 260, receiver 268, writing logic 266, and driver software 150. The segregator 260 further comprises masking logic 262 and swapping logic 264. The segregator 260 is configured to segregate an entire packet into two contiguous groups, a first group comprising a first type of data and a second group comprising a second type of data. The receiver 268 is configured to receive data over a PCIE connection (e.g., from BIU 118). The writing logic 266 is configured to write data to a cache (e.g., Z cache 234, T-cache 242). The driver software 150 is configured to coordinate and control functionality of the receiver 268 and the segregator 260. One skilled in the art would appreciate in the context of this disclosure that one or more of the various logic (e.g., 260, 268, 266, etc.) of the packet processing system 100 may be duplicated for each packet unit 236 and 238 or shared in some embodiments.

Referring to FIGS. 2A and 2B, in one embodiment, the P units 236 and 238 comprise logic gates, including registers, configured to enable mask (masking logic 262) and byte swapping (swapping logic 264) functionality, among other functionality such as edge calculations. The ZL2 unit 232 and the ZL3 unit 244 access the Z cache 234. The D unit 246 is coupled to the PS 240 and ZL3 unit 244, and is responsible for color functionality, as is known, and further accesses the D cache 248. The PS 240 accesses the T cache 242, which corresponds to texture processing according to well-known mechanisms. Note that functionality of one or more components shown in FIGS. 2A and 2B may be combined in a single component in some embodiments, or functionality of a single component may be distributed among two or more components.

In operation, the BCI 220 receives a command from the driver software 150 or other software to draw a triangle or other primitive. The BCI 220 also receives vertex information corresponding to the triangle to be drawn. The vertex information is passed to the VS 222, where vertex transformations are implemented. The VS 222 may comprise shader programming or code executed on a programmable unit (e.g., core processor or engine in the GPU 114). In some embodiments, the VS 222 may be implemented as a fixed function unit. In particular, objects are transformed from object space to work space and screen space as triangles. The triangles are passed to the TSU 224, which assembles primitives, and also performs well-known tasks such as bounding box generation, culling, edge function generation, and triangle level rejections, among other well-known functions. The TSU 224 passes data to the STG unit 226, which provides tile generation functionality, whereby the data objects are segmented into tiles (e.g., 8×8, 16×16, etc.) and passed to the ZL1 unit 228.

The ZL1 unit 228, like the ZL2 and ZL3 units 232, 244, respectively, performs z-value processing, such as high-level rejection of z-values (e.g., where fewer bits are consumed than similar processing at a lower level). The ZL units 228, 232, and 244 operate in conjunction with the ZL1 cache 230, Z cache 234, and Z cache 234, respectively. The PS 240 may comprise shader programming executed on a programmable unit (e.g., core processor or engine in the GPU 114) that receives texture and pipelined data and provides outputs to the D unit 246 and ZL3 unit 244. In some embodiments, the PS 240 may comprise a fixed function unit. The D unit 246 and ZL3 unit 244 are configured to perform alpha testing and stencil testing before values in the Z cache 234 or D cache 248 need to be updated.

Figure 3:
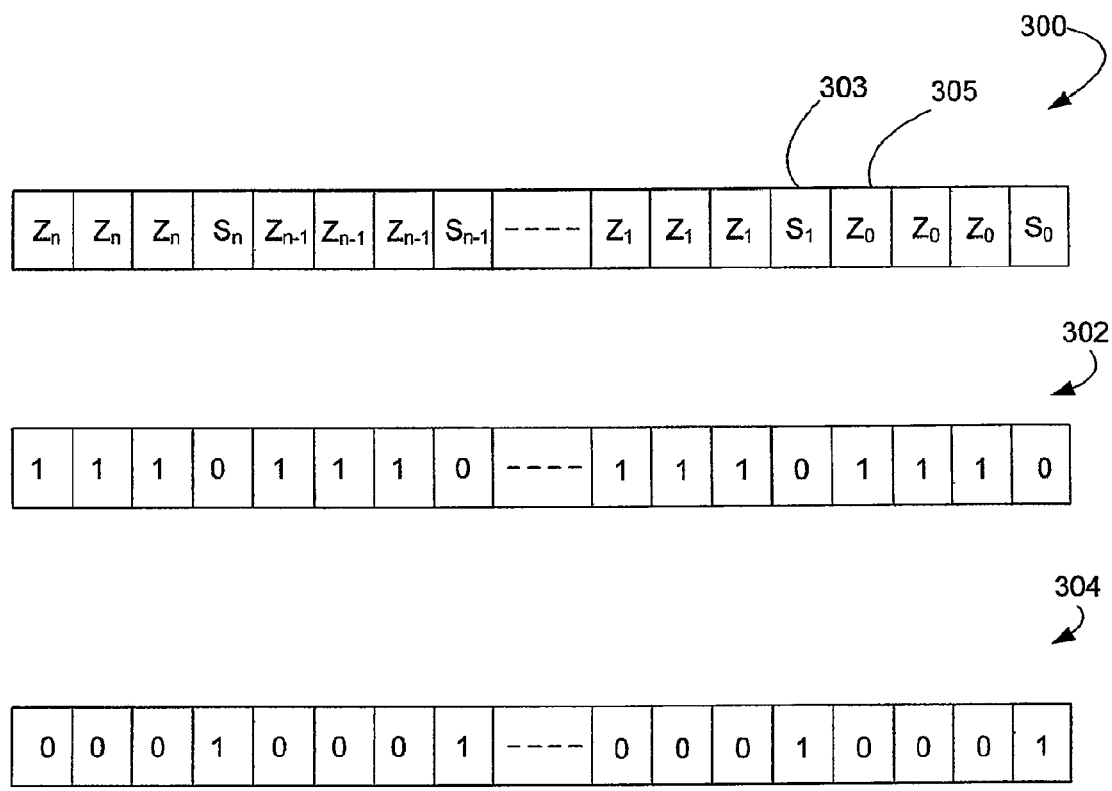
FIG. 3 shows an exemplary pre-packaged packet body structure and exemplary byte masks implemented by the packet processing system shown in FIG. 2B.
Figure 4:
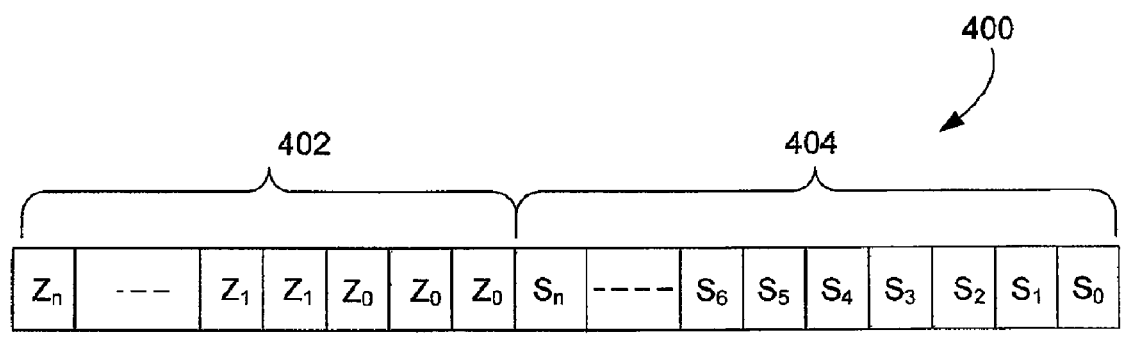
FIG. 4 shows an exemplary post-packaged packet body structure resulting from a mask and swap operation performed on the pre-packaged packet shown in FIG. 3.

The P units 236 and 238 process packets (e.g., perform segregate and swap functionality, as explained below) corresponding to the z-data and s-data cached in the Z cache 234 and T cache 242, respectively. For instance, a host application may request processing of a surface derived from only z-data (to the exclusion of s-data). The host application request is implemented through the driver software 150 communicated to the GPU 114 via the BIU 118. The driver software 150 programs registers in the GPU 114 and instructs a core processor (e.g., engine) in the GPU 114 to enable this z-only format. In response to the instructions conveyed by the driver software 150 on behalf of the host application, the core processor generates a mask and stores in one or more registers accessible to the P units 236 and 238 to enable the P units 236 and/or 238 to perform the segregate and swap functionality before outputting the required packet format (i.e., z-only) via the BIU 118 or MIU 110. For instance, the P unit 238, in response to a read request to the BIU 118, receives data from the BIU 118 in a pre-processing packing format (see FIG. 3, the packet labeled as 300). The address of the packet corresponding to reading (or writing) operations may be generated by the core processing unit (e.g., engine) in the GPU 114. Referring to FIG. 3, the packet 300 comprises two different types of data comprising stencil (s) data 303 and depth or z-data 305. In this exemplary implementation, three contiguous bytes (each block in FIGS. 3 and 4 holding a z or s data represent a byte) of z-data 305 (e.g., $z_0$, $z_0$, $z_0$) are paired with a single stencil (s) data 303 (e.g., $s_0$). The P unit 238 imposes a mask operation on the entire packet body using byte mask 302, and swaps the data to form a pixel packet 400 having a post-processing packing format comprising two separate and contiguous groups 402 (z-data) and 404 (s-data) as shown in FIG. 4. The P unit 238 writes one of the groups 402 or 404 to the T cache 242. Note that the P unit 238 may write both s and z-data to the T-cache 242, but in one embodiment, the write occurs in a mixed format (e.g., packet 300) as shown in FIG. 3.

With regard to the P unit 236, data in the Z cache 234 is formatted in a pre-processing packing format as shown by packet 300 in FIG. 3. For example, in response to a write request to the BIU 118, the packet 300 stored in the Z cache 234 has a mask operation (e.g., logic operation) imposed upon it by the P unit 236, and the data of the packet is swapped by the P unit 236. The result of the above-described mask and swap operation is that the data is formatted to pixel packet 400 comprising a post-processing packing format as shown in FIG. 4. Various stages, labeled A and B in FIG. 2, are described below in association with FIGS. 3-4.

Referring to FIG. 3, shown is the exemplary packet 300. The packet 300 represents a packet in the stage designated as "A" in FIG. 2A (pre-processing packing format). As described above, a repetitive pattern comprising a combination of at least two different types of data (e.g., three contiguous bytes of z-data 305 (e.g., $z_0$, $z_0$, $z_0$) paired with a single byte of stencil (s) data 303 (e.g., $s_0$)) comprise the packet 300. In operation, if the z-data 305 is the only data to be written (i.e., to the exclusion of the s-data 303), the P unit 236 (or P unit 238, with the P unit 236 discussed hereinafter for brevity with the understanding that similar application applies to the P unit 238) performs a byte-enable operation on the entire packet body 300. That is, the P unit 236 imposes a byte mask 302 on the entire packet 300, the byte mask 302 having a bit pattern as shown that disables the s-data 303 and enables the z-data 305. Thus, the byte mask 302 imposed by the P unit 236 comprises the data pattern 11101110 . . . 1110. That is, the P unit 236 imposes a zero (0) value every 4 bits, with the 0-bit value representing disabling functionality (i.e., causing the masked bit to retain its value). The bit value of one (1) represents enabling functionality, or rather, allows that masked bit to be passed. One skilled in the art would understand in the context of this disclosure that the mask bit value and associated functionality can be reversed to represent disabling and enabling functionality in some embodiments (e.g., "1" to disable, "0" to enable).

Note that if it is desired to write s-data 303 (to the exclusion of the z-data 305), then the pattern would comprise an inversion of the bit pattern as shown by byte mask 304, namely, 00010001 . . . 0001. Further, if it is desired that all bits are passed, then the mask bit pattern would comprise all ones (1s) (not shown). Thus, the P units 236 (and 238) imposes a byte mask 302 that provides for selective writes of the combined and contiguous bytes of the packet body 300.

FIG. 4 represents a pixel packet 400 in the stage designated as "B" in FIG. 2A, and shows a post-processing packing format that comprises two contiguous groups of z-data 402 and s-data 404. The pixel packet 400 may be written to local memory 106 via MIU 110 or to the BIU 118 (or one of the groups 402 or 404 may be written to the T cache 242 by P unit 238 in response to a read request to the BIU 118, or both s and z-data may be written to the T cache 242 in mixed format as explained above). As shown, the z-data group 402 and s-data group 404 are segregated from each other to enable select writes of contiguous chunks (bits or bytes) of data. In one embodiment, all of the z-data of group 402 is moved (e.g., swapped) to the first packet portion (e.g., first 48 bytes), and all of the s-data of group 404 is moved to the last packet portion (e.g., the last 16 bytes). For example, 16 bytes may be designated for the s-data group 404, which are retained based on the "0" mask bit values. The 48 bytes corresponding to the "1" mask bit values described in FIG. 2A enable the write of z-data group 402 only (to the exclusion of the s-data group 404). If the s-data group 404 is desired to be written, similar processing may be applied with the "1" mask bit values applied to the zero values.

Figure 5:
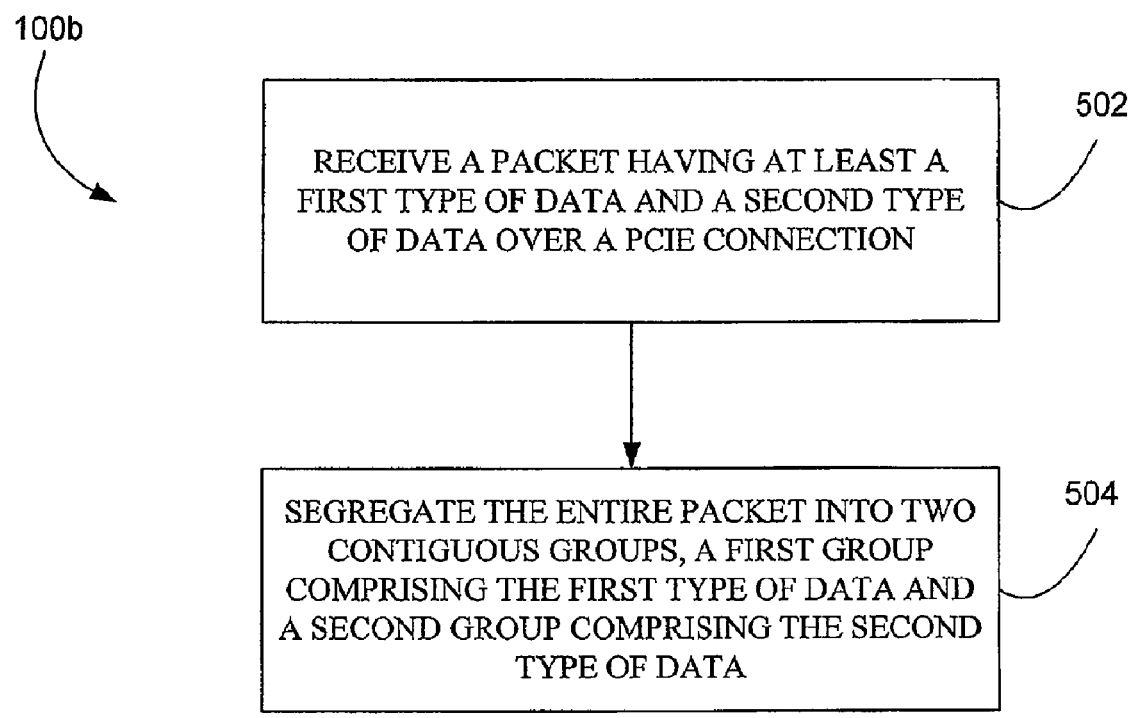
FIG. 5 is a flow diagram that illustrates a packet processing method embodiment.

FIG. 5 is a flow diagram that illustrates a packet processing method 100b embodiment that may be implemented under the control of driver software 150 in cooperation with the P units 236 and/or 238. One method embodiment, among others, comprises receiving a packet having at least a first type of data and a second type of data over a PCIE connection (502), and segregating the entire packet into two contiguous groups, a first group comprising the first type of data and a second group comprising the second type of data (504).

Any process descriptions or blocks in the flow diagram shown in FIG. 5 should be understood as representing modules, segments, or portions of code which include one or more executable instructions for implementing specific logical functions in the process, and alternate implementations are included within the scope of the disclosed embodiments in which functions may be executed out of order from that shown or discussed, including substantially concurrently or in reverse order, depending on the functionality involved, as would be understood by those reasonably skilled in the art of the present invention.

It should be emphasized that the above-described embodiments of the disclosure, particularly, any "preferred" embodiments, are merely possible examples of implementations, merely set forth for a clear understanding of the principles of the packet processing systems and methods. Many variations and modifications may be made to the above-described embodiment(s) without departing substantially from the spirit and principles of the invention. All such modifications and variations are intended to be included herein within the scope of this disclosure and protected by the following claims.

What is claimed is:

1. A packet processing system in a peripheral component interconnect-express (PCIE) compliant system, comprising:

a receiver for receiving a packet having at least a first type of data and a second type of data over a PCIE connection;

a segregator for segregating the entire packet into two contiguous groups, a first group comprising the first type of data and a second group comprising the second type of data;

masking logic configured to mask the first type of data and the second type of data;

swapping logic configured to swan the first type of data and the second type of data according to the mask result of the masking logic; and a writing logic for writing one of the two contiguous groups to the exclusion of the other contiguous group.

2. The system of claim 1, wherein the writing logic is further configured to write one of the two contiguous groups to a memory through a memory interface unit.

3. The system of claim 1, wherein the writing logic is further configured to write one of the two contiguous groups to a bus interface unit coupled to one or a combination of a system memory, a host processor, and a chipset.

4. The system of claim 1, wherein the writing logic is further configured to write at least a contiguous byte of stencil data, a contiguous byte of z-data, or both.

5. The system of claim 1, wherein the writing logic is further configured to write at least a contiguous byte of color data, a contiguous byte of alpha data, or both.

6. The system of claim 5, wherein the masking logic is further configured to generate one or a combination of enabling and disabling mask bits and impose the mask bits on the z data and the stencil data.

7. The system of claim 1, further comprising driver software configured to coordinate and control functionality of the receiver and the segregator.

8. A method for processing a packet in a peripheral component interconnect-express compliant (PCIE) system, comprising:

receiving a packet having at least a first type of data and a second type of data over a PCIE connection;

segregating the entire packet into two contiguous groups according to a mask having a bit pattern for enabling the two contiguous groups, a first group comprising the first type of data and a second group comprising the second type of and writing one of the two contiguous groups to the exclusion of the other contiguous group.

9. The method of claim 8, wherein writing comprises writing one of the two contiguous groups to a memory through a memory interface unit.

10. The method of claim 8, wherein writing comprises writing one of the two contiguous groups to a bus interface unit coupled to one or a combination of a system memory, a host processor, and a chipset.

11. The method of claim 8, wherein writing comprises writing at least a contiguous byte of stencil data, a contiguous byte of z-data, or both.

12. The method of claim 8, wherein writing comprises writing at least a contiguous byte of color data, a contiguous byte of alpha data, or both.

13. The method of claim 8, wherein segregating comprises swapping the first type of data and the second type of data.

14. The method of claim 8, wherein segregating comprises masking the first type of data and the second type of data.

15. The method of claim 14, wherein masking comprises generating one or a combination of enabling and disabling mask bits and imposing the mask bits on the z data and the stencil data.

16. The method of claim 8, further comprising coordinating and controlling receiving and segregating.

17. A graphics processor system, comprising:

a peripheral component interconnect-express (PCIE) connection; and a graphics processing unit coupled to the PCIE connection, the graphics processing unit comprising packet logic configured to receive a packet having at least two types of data over the PCIE connection and separate the entire packet into two contiguous groups, a first group comprising a first type of data and a second group comprising a second type of data;

wherein packet logic is further configured to separate the entire packet by writing one of the two types of data to the exclusion of the other type of data according to a byte mask that provides for selective write of the two contiguous groups.

18. The graphics processor system of claim 17, wherein the first type of data comprise z-data and the second type of data comprises stencil data.

19. The graphics processor system of claim 17, wherein the first type of data comprise color data and the second type of data comprises alpha data.

20. The graphics processor system of claim 17, further comprising driver software configured to provide the packet to the graphics processing unit over the PCIE connection.

\* \* \* \* \*